US006826956B1

(12) United States Patent
Mathews

(10) Patent No.: US 6,826,956 B1
(45) Date of Patent: Dec. 7, 2004

(54) DIFFERENTIAL PRESSURE LEVEL CONTROL

(75) Inventor: Russell Van Mathews, Lake Wales, FL (US)

(73) Assignee: Cargill, Inc., Wayzata, MN (US)

( * ) Notice: Subject to any disclaimer, the term of this patent is extended or adjusted under 35 U.S.C. 154(b) by 0 days.

(21) Appl. No.: 10/663,840

(22) Filed: Sep. 17, 2003

(51) Int. Cl.[7] ............................................. G01F 23/14
(52) U.S. Cl. ........................ 73/299; 73/290 R; 73/298
(58) Field of Search ............................. 73/299, 290 R, 73/298

(56) References Cited

U.S. PATENT DOCUMENTS

| | | | | | |
|---|---|---|---|---|---|
| 4,338,809 | A | * | 7/1982 | Englund | 73/1.73 |
| 5,115,679 | A | * | 5/1992 | Uhlarik | 73/302 |
| 5,563,584 | A | * | 10/1996 | Rader et al. | 340/618 |
| 5,791,187 | A | * | 8/1998 | Chang | 73/299 |
| 5,901,603 | A | * | 5/1999 | Fiedler | 73/299 |
| 6,510,736 | B1 | * | 1/2003 | Van Ee | 73/299 |
| 6,527,960 | B1 | * | 3/2003 | Bacon et al. | 210/741 |
| 6,647,781 | B2 | * | 11/2003 | Su | 73/299 |

FOREIGN PATENT DOCUMENTS

JP 02075933 A * 3/1990 ............ G01N/9/26

OTHER PUBLICATIONS

"Chapter 11, Sulfunic and Phosphoric Acids", Fertilizer Manual, Kluwer Academic Publishers, 1998, pp. 296–353.
I.A Series® Electric d/p Cell® Transmitters with HART Communication Protocol IDP10 Series for Differential Pressure Measurments, Foxboro Product Specifications, 1995, pp. 1–20.
"Series 62 Constant–Differential; Relays", pp. 7.21–7.22, Siemens Energy & Automation, www.sea.siemens.com.

* cited by examiner

Primary Examiner—Hezron Williams
Assistant Examiner—Rodney Frank
(74) Attorney, Agent, or Firm—Banner & Witcoff, Ltd.

(57) ABSTRACT

A system and method for method for measuring the vertical level of fluid in a container is provided. According to one aspect of the invention, a method for measuring the vertical level of fluid in a container includes moving air downward along the inside of a bubble tube at an angle of about 5 degrees to about 85 degrees from vertical into the fluid. According to another aspect, the method includes injecting a mixture of air and steam into fluid in a container via a bubble tube. Aspects of the present invention further provide a differential pressure bubbler system that includes a bubble tube mounted to a tank at an angle of about 5 degrees to 90 degrees. Aspects additionally provide a bubble tube having a diameter of about 1 inch to about 6 inches. Further aspects include a bubble tube having pressurized air and steam inputs.

31 Claims, 7 Drawing Sheets

DIFFERENTIAL PRESSURE LEVEL CONTROL

TECHNICAL FIELD

This invention relates generally to systems and methods for monitoring the vertical level (height) of fluid contained in a container. More particularly, the invention concerns differential pressure level monitoring systems and methods.

BACKGROUND

Various systems and methods exist for monitoring the vertical level of fluid in a container. As used herein, a container generally refers to a structure for holding or transporting a fluid, such as a reservoir, an open or closed channel, a tank, or a reactor. These include visual measurement systems, microwave technologies, ultrasonic technologies, submerged pressure transducers, and differential pressure bubbler systems. Each of these includes various drawbacks. Visual measurement systems are not efficient. Ultrasonic technologies, microwave technologies, and submerged pressure transducer systems are expensive and they do not work well with turbulent processes, with fluids containing foam and/or suspended solids, or with corrosive fluids.

Existing differential pressure bubbler systems work well for measuring the vertical level of fluid in situations where turbulence, debris, foam, or corrosive substances make other systems impractical. However, conventional differential pressure bubbler systems suffer from a number of problems. For instance, they tend to become clogged often, which affects the accuracy of pressure measurements or prevents these measurements entirely. Further, they need frequent cleaning to remove build-up or clear clogs.

As an example, FIG. 1 shows a typical differential pressure bubbler system 10. As shown, bubbler system 10 includes a tank 12 containing fluid 14, a small-diameter bubble tube 16, an air supply 18, and a differential pressure controller 20. In general, bubbler system 10 measures the hydrostatic pressure in fluid 14 near the bottom of tank 12 by comparing atmospheric pressure with the pressure required to force air from bubble tube 16. Bubble tube 16 is a small-diameter (less than 1.0 inch diameter) vertical tube about 15 feet long, which permits bubbles to flow from its opening 141 near the bottom of tank 12. Air supply 18 provides air to bubble tube 16 at a pressure slightly greater than the hydrostatic pressure at the end 22 of bubble tube 16. Small-diameter tubing is used for bubble tube 16 to reduce false readings and lag time in reading pressure changes, which can occur when a large volume of air is maintained in pressure tube 16. Differential pressure controller 20 is connected to bubble tube 16 and includes one or more pressure sensors that sense atmospheric pressure and the air pressure in bubble tube 16.

Differential pressure controller 20 calculates hydrostatic pressure, H, at the opening 22 of bubble tube 16 by comparing the atmospheric pressure and bubble tube pressure according to the following formula: $H = \Delta P / Sg$, where $\Delta P$ = the difference between bubble tube pressure and atmospheric pressure, and $Sg$ = specific gravity of fluid 14. The vertical level of fluid 14 above the opening can be determined based on the hydrostatic pressure, H, at the opening 22 of bubble tube 16. Further, if the vertical level of fluid 14 is known, the same system can be used to determine the specific gravity, $Sg$, of fluid 14.

Such conventional differential pressure bubbler systems suffer from a number of problems. For example, bubble tube 16 periodically becomes clogged with build-up, scale, sludge, settlement and/or debris, which affects the accuracy of pressure measurements or prevents these measurements entirely. As such, bubble tube 16 often needs to be purged with high-pressure air to clear obstructions. Purging, however, does not completely remove scale or other build-up on the surfaces of bubble tube 16 and at opening 22. Thus, bubble tube 16 is periodically removed from tank 12 to clean scale and other materials from the bubble tube 16. Removing bubble tube 16 for cleaning is expensive and time-consuming. Further, such periodic removal and cleaning can be dangerous, depending on the type of fluid 14 in tank 12.

Accordingly, there is a need for improved systems and methods for measuring the vertical level of fluid in a container. Further, a need exists for improved low-maintenance differential pressure bubbler systems and methods.

SUMMARY

In order to overcome the above-described problems and other problems that will become apparent when reading this specification, aspects of the present invention provide a method for measuring the vertical level (height) of fluid in a container. According to one aspect of the invention, a method for measuring the vertical level of fluid in a container includes moving air downward along the inside of a bubble tube at an angle of about 5 degrees to about 85 degrees from vertical into the fluid. According to another aspect, the method includes injecting a mixture of air and steam into fluid in a container via a bubble tube.

Aspects of the present invention further provide a differential pressure bubble tube system that includes a bubble tube mounted to a container at an angle of about 5 degrees to about 90 degrees. Aspects additionally provide a bubble tube having a diameter of about 1 inch to about 6 inches. Further aspects include a bubble tube having pressurized air and steam inputs. Other features and advantages of various aspects of the invention will become apparent with reference to the following detailed description and figures.

BRIEF DESCRIPTION OF THE DRAWINGS

101 The invention will be described in detail in the following description of preferred embodiments with reference to the following figures wherein:

FIG. 6b is a close-up view of the differential pressure bubbler system of FIG. 6a.

DETAILED DESCRIPTION OF THE FIGURES

Figure 2:
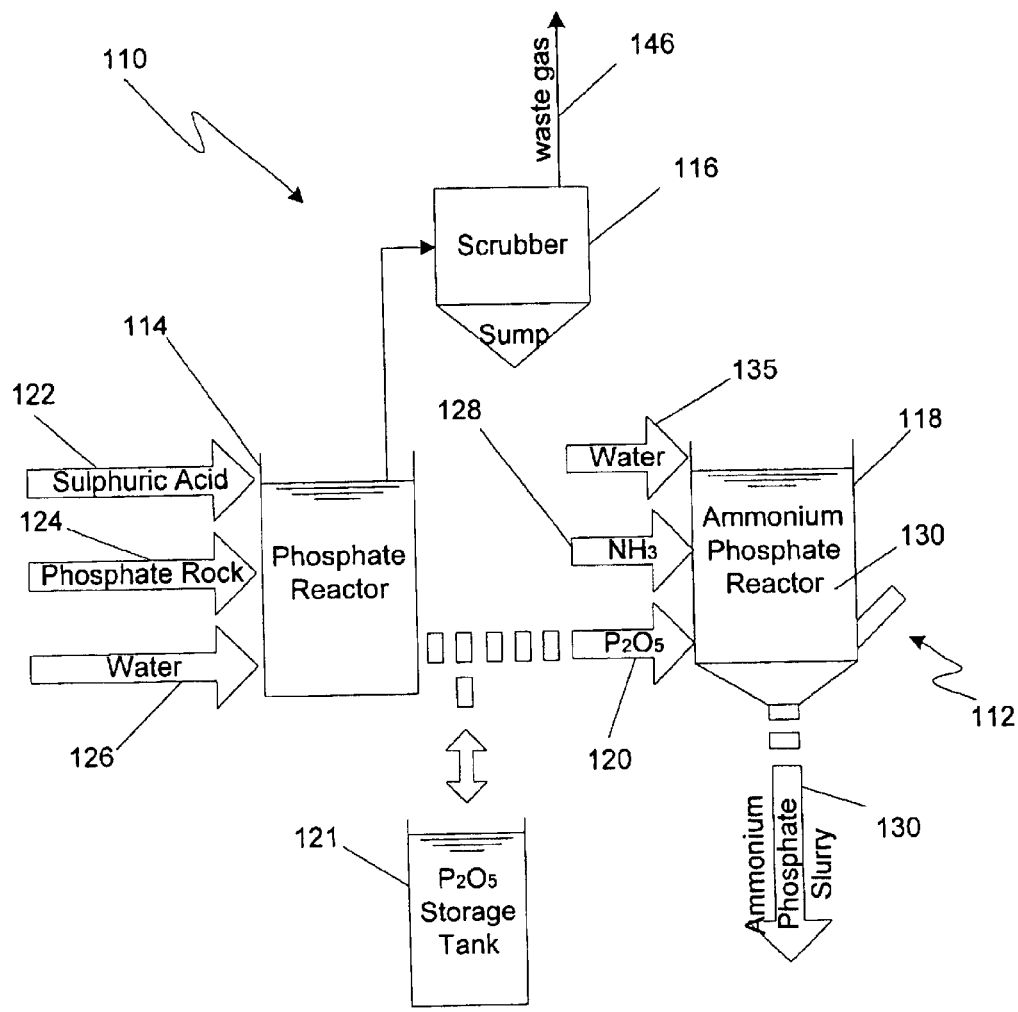
FIG. 2 shows an ammonium phosphate production system that includes a differential pressure bubbler system according to an embodiment of the invention.
Figure 3:
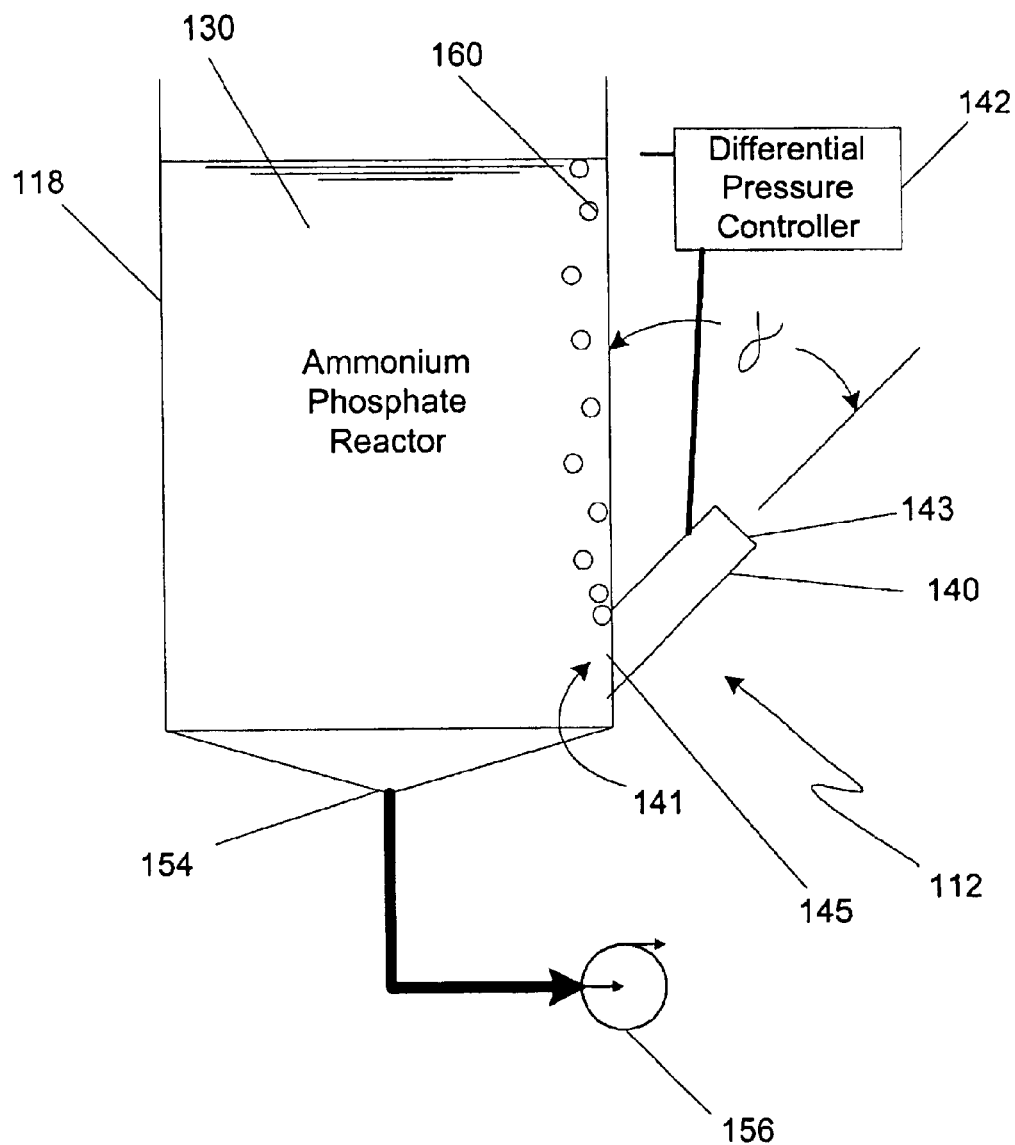
FIG. 3 shows the differential pressure bubbler system of FIG. 2 connected to an ammonium phosphate reactor of the ammonium phosphate production system of FIG. 2.
Figure 4:
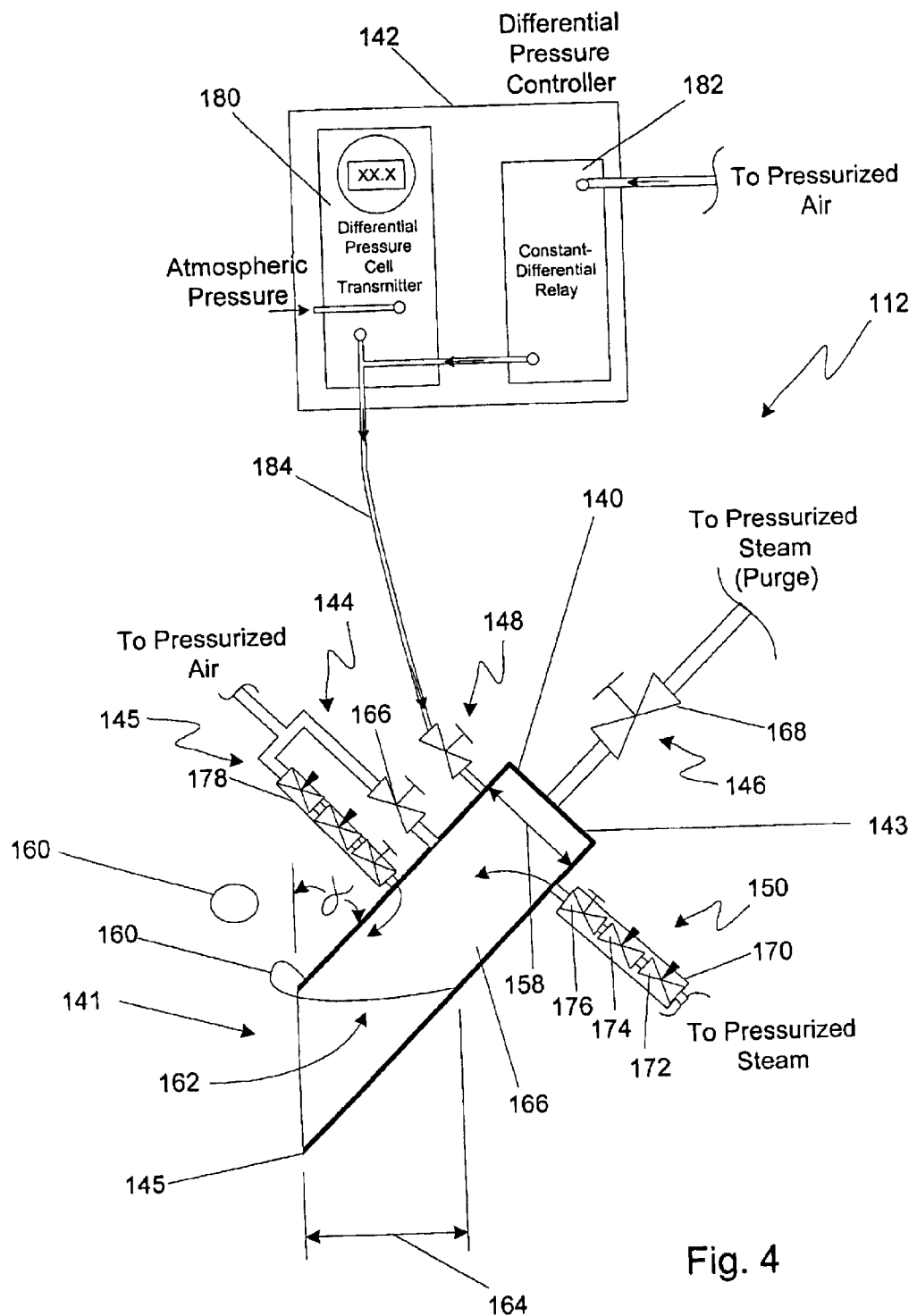
FIG. 4 is a close-up view of the differential pressure bubbler system of FIG. 3.

The various aspects of the invention may be embodied in various forms. The following description of the figures shows by way of illustration various embodiments in which aspects of the invention may be practiced. It is to be understood that other embodiments may be utilized and structural and functional modifications may be made without departing from the scope of the present invention. Referring now to FIGS. 2–4, an ammonium phosphate production system 110 is shown, which includes a differential pressure bubbler system 112 according to an embodiment of the invention. Although an ammonium phosphate production system is shown and described as an illustration, aspects of the invention are applicable to a wide variety of manufacturing and production systems and processes.

Suppose as an example that ammonium phosphate production system 110 produces ammonium phosphate for use in producing fertilizer. As shown in FIG. 2, system 110 includes a phosphate reactor 114, one or more scrubbers 116, and an ammonium phosphate reactor 118, which includes a differential pressure bubbler 112. In this example, phosphate reactor 114 produces phosphoric acid 120 via a wet-process by reacting sulfuric acid 122 with phosphate rock 124 in water 126. The phosphate rock may be obtained from mining and recovery operations (not shown) and the sulfuric acid 122 may come from a sulfuric acid plant (not shown). The resultant from this reaction, which occurs primarily in reactor tank 114, is subsequently filtered and processed to provide aqueous phosphoric acid, $P_2O_5$, 120, which may be stored in $P_2O_5$ storage tank 121. Scrubber 116 removes harmful substances, such as particulate, from exhaust gases produced during this reaction.

Phosphoric acid 120 is used an input to an ammonium phosphate production process, which includes reactions in one or more reactors 118. The ammonium phosphate process may produce various types of ammonium phosphate, such as monoammonium phosphate (MAP), diammonium phosphate (DAP), or triammonium phosphate (TAP). Suppose that granular DAP is produced by a slurry process that partially occurs in reactor 118. To create a slurry of ammonium phosphate, phosphoric acid 120 having a concentration of about 25% to 60% $P_2O_5$ is added to reactor 118. Preferably, weak phosphoric acid is added, which may be available at a plant from various processes and has a concentration of about 30%, along with more concentrated phosphoric acid having a concentration of about 50%. Thus, phosphoric acid 120 having an average concentration of about 40% is added to reactor 118. Ammonia 128 is also added to reactor 118 to react with phosphoric acid 120.

Phosphoric acid 120 reacts violently with ammonia 128 to produce a slurry 130 in reactor 118. The slurry is raised to its boiling point of about 115 degrees Celsius due to the heat of reaction, which causes water to evaporate from the slurry. As such, the slurry becomes a relatively sticky, thick substance having a specific gravity of about 1.6. Slurry 130 exits reactor 118 at its bottom via exit port 154 and is pumped by pump 156 to further processing locations. Due to the acidic nature of slurry 130, reactor 118 is preferably made of stainless steel, such as 316 stainless steel; although, other materials may be used. Because of the violence of the reaction and its heat of reaction, slurry 130 is turbulent while in reactor 118 and contains many bubbles.

Figure 1:
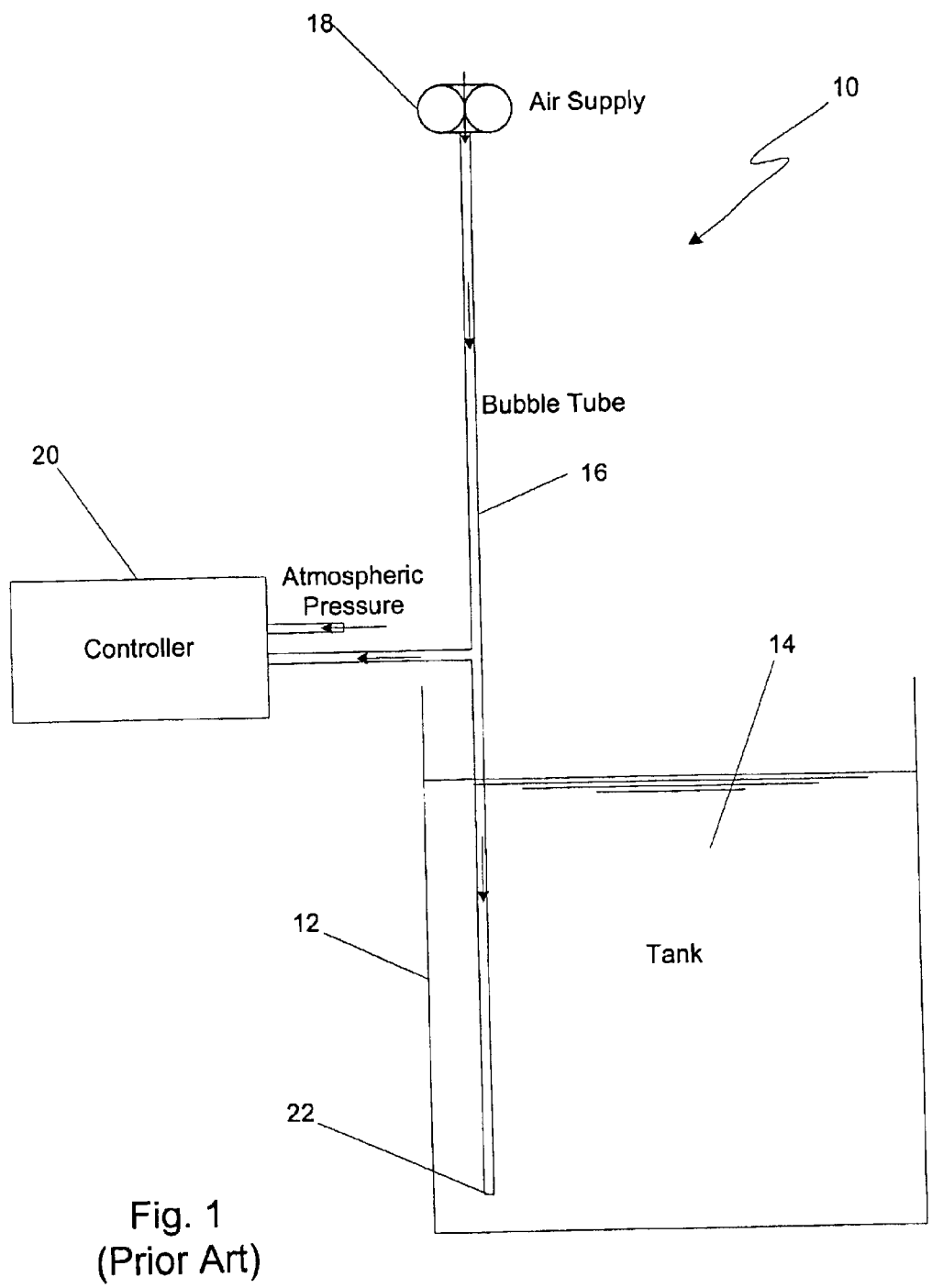
FIG. 1 shows a conventional differential pressure bubbler system.

The turbulent nature of slurry 130, the bubbles, its high temperature, and the sticky nature of slurry 130 makes various level monitoring technologies inaccurate and/or impractical. For example, microwave technologies, ultrasonic technologies, and submerged pressure transducers do not provide accurate measurements with such a turbulent, bubbly substance. Further, conventional differential pressure bubbler systems 10, such as shown in FIG. 1, are susceptible to quickly becoming clogged.

Without accurate level monitoring, the vertical level of slurry 130 in reactor 1118 can become too low or dangerously high. If the vertical level is too low, the reaction to form slurry 130 may not be complete or the slurry may not be sufficiently evaporated to properly form granulated ammonium phosphate. This can cause expensive production delays and material losses. If it is too high, reactor 118 may overflow, which can be dangerous to workers, production equipment, and/or the environment.

As shown in FIGS. 3 and 4, differential pressure bubbler 112 provides a low-maintenance, accurate method for monitoring the quantity of slurry 130 as a function of its vertical level in reactor 118. According to the present embodiment, differential pressure bubbler 112 includes a bubble tube 140, a differential pressure controller 142, an air purge line 144, an air supply line 145, a steam purge line 146, a pressure sensor line 148, and a steam bubble line 150. Bubble tube 140 has a closed end 143 and an opening 141 at opposing end 145, which is attached to a side portion of reactor 118 near its bottom. Steam purge line 146 and air purge line 144 are attached near the closed end 143 of bubble tube 140 to provide pressurized air and steam for periodic purging of bubble tube 140. Steam bubble line 150 and air supply line 145 are attached to bubble tube 140 for providing a substantially constant flow of air and steam during bubbler operation.

Pressure sensor line 148 is attached to bubble tube 140 for sensing the back pressure of air 166 within bubble tube 140 during bubbler operation via differential pressure controller 142. Differential pressure controller 142 may be mounted to reactor 118 or another supporting structure as desired. Differential pressure controller 142 receives pressurized air, which it meters to provide a substantially continuous supply of metered air to pressure sensor line 148. The substantially constant flow of air acts to purge any condensation from pressure sensor line 148. By providing metered air, fluctuations in the flow of purge air are reduced or eliminated, which reduces sensor inaccuracies related to noise from such fluctuations. As shown, differential pressure controller 142 is preferably mounted above bubble tube 140, and pressure sensor line 148 is preferably substantially vertical, which reduces the amount of condensation that can collect in pressure sensor line 148. Pressure sensor line 148 may include a TEFLON-lined stainless steel tube or like tubing.

Back pressure is sensed by controller 142 during operation and compared with atmospheric pressure to determine hydrostatic pressure near the mouth 162 of bubble tube 140. Mouth 162 is the effective opening into slurry 130, where air 166 within bubble tube 140 meets slurry 130. Based on the hydrostatic pressure and with a known, specific gravity, controller 142 determines the vertical level of slurry 130 in reactor 118, which permits accurate control of production processes to control the vertical level.

Bubble tube 140 is attached to reactor 118 near its bottom at a point above slurry exit port 154. Bubble tube 140 is attached to reactor 118 at a vertical angle γ. In the present scenario for producing ammonium phosphate slurry 130, vertical angle γ is about 5 degrees to about 85 degrees. Preferably, vertical angle γ is about 30 degrees to about 60 degrees, and more preferably vertical angle γ is about 45 degrees. To reduce build-up at the mouth 162 of bubble tube 140, bubble tube preferably has a diameter 158 larger than 1 inch. For the present ammonium phosphate-processing scenario, the diameter 158 of bubble tube 140 is preferably about 2 inches to about 6 inches, and more preferably is about 4 inches. Bubble tube 140 may be made from metal piping, such as carbon steel pipe, stainless steel pipe, or cast iron pipe preferably having a diameter of about 2 inches to about 6 inches. Due to the reaction temperatures and turbulence of slurry 130, steel pipe is preferably used. Other materials may also be used, particularly for less violent or cooler applications, such as aluminum pipe, pvc pipe, hdpe pipe, etc. Further, square tubing or other hollow materials may also be used.

The size and orientation of bubble tube 140 provide advantages over conventional bubbler systems. For example, the opening 141 or mouth 162 of a 4-inch bubble tube is much less likely to clog than a smaller tube. As such, less maintenance is required and pressure readings are generally more accurate. Also, mounting bubble tube 140 at vertical angle γ permits bubble tube 140 to be mounted much closer to the bottom of reactor 140. Thus, bubble tube 140 can be much shorter than conventional vertical bubble tubes. For instance, bubble tube 140 may be about 10 inches to about 24 inches long when mounted at the base of reactor 118 and angled away from reactor 118, and more preferably may be about 12 inches long. This is much shorter than a 15-foot long, 1-inch diameter, vertical tube for a conventional bubble tube used with tank 12 shown in FIG. 1. However, the volume of air retained in such a conventional bubble tube and the volume retained in bubble tube 140 at 12 inches in length is about the same. Thus, problems associated with a large volume of air in a bubble tube are avoided using differential pressure bubbler system 112 with a shorter bubble tube 140, such as inaccurate readings and noise.

Further, small bubbles 160 may easily be released from an upper portion of opening 141 when bubble tube 140 is oriented at an angle slightly off of vertical to almost horizontal. Releasing smaller bubbles 160 reduces the amount of air introduced into slurry 130 from bubble tube 140. Smaller bubbles create less noise and pressure variation, which can improve the accuracy of controller 142. In addition, placing bubble tube 140 at an angle γ from vertical provides a larger effective mouth 162 for bubble tube 140. For instance, during operation, slurry 130 enters bubble tube 140 a distance 164 until it encounters air 166 retained within the bubble tube. Thus, the mouth 162 of bubble tube 140 is the diameter of the bubble tube at distance 164, or about 5.2 inches for a four-inch bubble tube mounted at 45 degrees from vertical. Such a larger mouth 162 further reduces the possibility of clogging.

In the event of a clog in opening 141 or mouth 162, air purge line 144 and steam purge line 146 may be opened individually or in combination. Air purge line 144 receives pressurized air from a compressed air supply (not shown), and steam purge line 146 likewise receives pressurized steam from a pressurized steam supply (not shown). Purge lines 144 and 146 may be made from conventional pressure pipe and include shutoff valves 166 and 168 respectively to permit and stop flow as desired. Providing high-pressure air and/or steam can purge obstructions from a clogged or partially blocked bubble tube 140. This is particularly effective for bubbler system 112 due to the large diameter of bubble tube 140. For example, air compressed to 100 p.s.i. provides over 1,250 pounds of force to a clog in the opening 141 of four-inch bubble tube 140. The same amount of pressure only provides about 79 pounds of force to a clog in a one-inch diameter bubble tube. As such, clogs are more easily removed with bubbler system 112 than conventional systems. As a result, downtime is reduced along with costs associated with clearing clogs or with more frequent maintenance to prevent them.

The combination of air and steam purging systems provides advantages for purging, as well as for producing bubbles during operation of bubbler 112. For example, the compressed air condenses steam introduced into bubble tube 140 while being heated to the saturation temperature of the steam. As a result, condensed steam collects along the inner surfaces of bubble tube 140 and at its mouth 162, which displaces slurry 130 around that point. Thus, water and dilute slurry exist about the end of bubble tube 140, which reduces the amount of scaling and build-up from contact with slurry 130. Further, purging with steam helps to soften scale, sludge, and other build-up materials on bubble tube 140, which can help to remove these substances. In addition, depending on the process fluid, advantages can be gained by heating the compressed air prior to contact with the process fluid. For example, the addition of steam can raise the temperature of ambient-temperature compressed air toward the saturation temperature of the steam, which may be, for instance, about 80 degrees Celsius. As slurry 130 in the present scenario is about 115 degrees Celsius, turbulence from the addition of cooler air to slurry 130 can thus be reduced or avoided.

Steam and air are preferably added together to bubble tube 140 during bubbler operation from pressure sensor line 148 and steam bubble line 150. Consequently, air for bubbles 160, flows generally downward against an upper surface of bubble tube 140 at about angle γ. Depending on the amount of condensation of the steam, the air for bubbles 160 can be substantially air alone or may include a mixture of air and steam. As shown in FIG. 4, steam is supplied via steam bubble line 150, which includes a double block valve 170 for controlling the flow of steam into bubble tube 140 during bubbler operation. Double block valve 170 includes a pair of needle valves 172, 174 in series, which reduces the pressure and flow of steam as desired. Double block valve 170 further includes a shutoff valve 176, such as a gate valve or a butterfly valve. As an example, needle valves 172 and 174 may be ⅛ inch needle valves. Preferably, these valves are set to provide a portion of the pressurized flow necessary to force out bubbles 160, but not enough flow to do so without the addition of air from air supply line 145.

Air supply line 145 includes a double block valve 178, which is similar to double block valve 170. As such, the pressure and desired flow of compressed air can be controlled by adjusting the needle valves of double block valve 178 as needed to overcome the hydrostatic pressure of slurry 130 at mouth 162. When the hydrostatic pressure is overcome, air flows downward along the upper inside portion of bubble tube 140 at about angle γ, which thereby produces bubbles 160. The pressure of air contained in bubble tube 166 while producing bubbles 160 is measured using a pressure sensor. The pressure sensor may include a pressure sensor along the inlet to pressure sensor line 148, or may include other configurations, such as one or more pressure transducers (not shown) mounted to bubble tube 140. As shown in FIG. 4, the pressure sensor may include a differential pressure cell transmitter 180 as part of controller 142.

Differential pressure cell transmitter 180 receives a constant supply of metered air from constant-differential relay 182. Constant-differential relay 182 is an airflow controller, as is known in the art, such as a MOORE 62VNA Constant-Differential Relay. Constant-differential relay 182 receives compressed air at varying pressure and flow rates and provides air at a constant output pressure and flow rate to sensor supply line 184. Cell/Transmitter 180 is attached to sensor supply line 184 and senses the overall pressure in sensor supply line 184, which changes according to the backpressure from air 166. As the vertical level of slurry 130 in reactor 118 changes, the change in hydrostatic pressure causes a corresponding change in air 166, and thereby to the pressure in sensor supply line 184. Cell/transmitter 180 senses the pressure in sensor supply line 184 and compares it with atmospheric pressure to determine the pressure differential. This information can be read directly from cell/transmitter 180, or cell/transmitter 180 can be set up to transmit this information to a network, recorder, controller, etc. (not shown) as desired, which may be located remotely from the cell/transmitter.

Differential pressure cell transmitter 180 is an electronic differential pressure cell transmitter, such as a FOXBORO IDP10 Intelligent d/p Cell Transmitter for differential pressure measurement. Cell/transmitter 180 calculates hydrostatic pressure around mouth 162 of bubble tube 140 using a known specific gravity by comparing the atmospheric pressure and bubble tube pressure according to the following formula: $H=\Delta P/Sg$, where $\Delta P$=the difference between bubble tube pressure and atmospheric pressure, and Sg=specific gravity of fluid 14. The vertical level of slurry 130 above opening 141 can be determined based on the hydrostatic pressure, H, around mouth 162.

Figure 5:
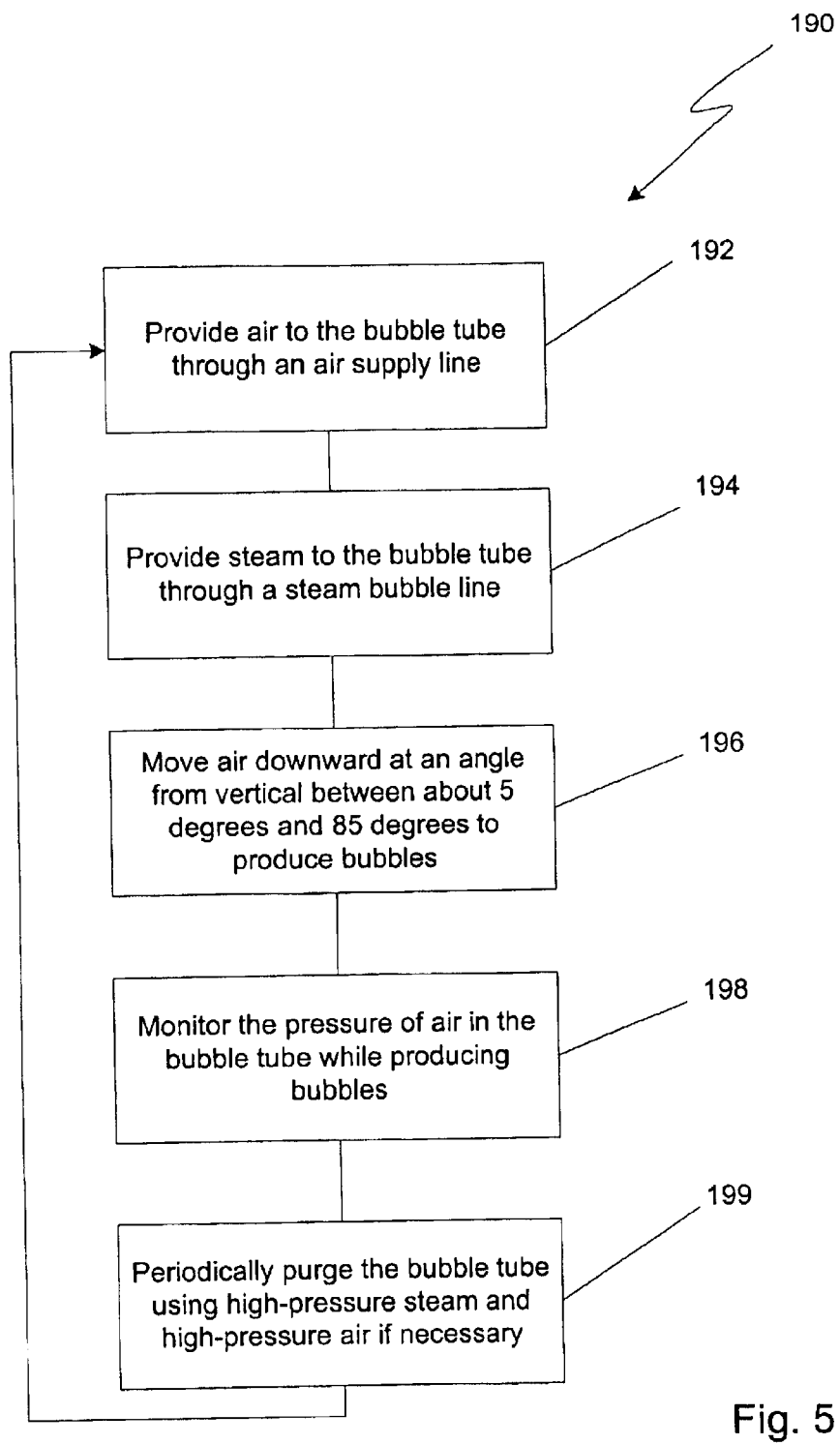
FIG. 5 illustrates steps involved with a method for monitoring the vertical level of a slurry contained in the reactor of FIG. 3 using the differential pressure bubbler system of FIGS. 2–4.

FIG. 5 illustrates a method 190 for monitoring the vertical level of slurry 130 in reactor 118 using differential pressure bubbler system 112. As shown, method 190 may include providing 192 air to bubble tube 140 through air supply line 145, and providing 194 steam to bubble tube 140 from steam bubble line 150. In addition, method 190 may include moving 196 air downward at angle γ to produce bubbles 160, and monitoring 198 the pressure of air in bubble tube 140 while producing bubbles 160. Further, method 190 may include periodically purging 199 bubble tube 140 when necessary by providing high pressure air and high-pressure steam to bubble tube 140 via purge lines 144 and 146.

Figure 6A:
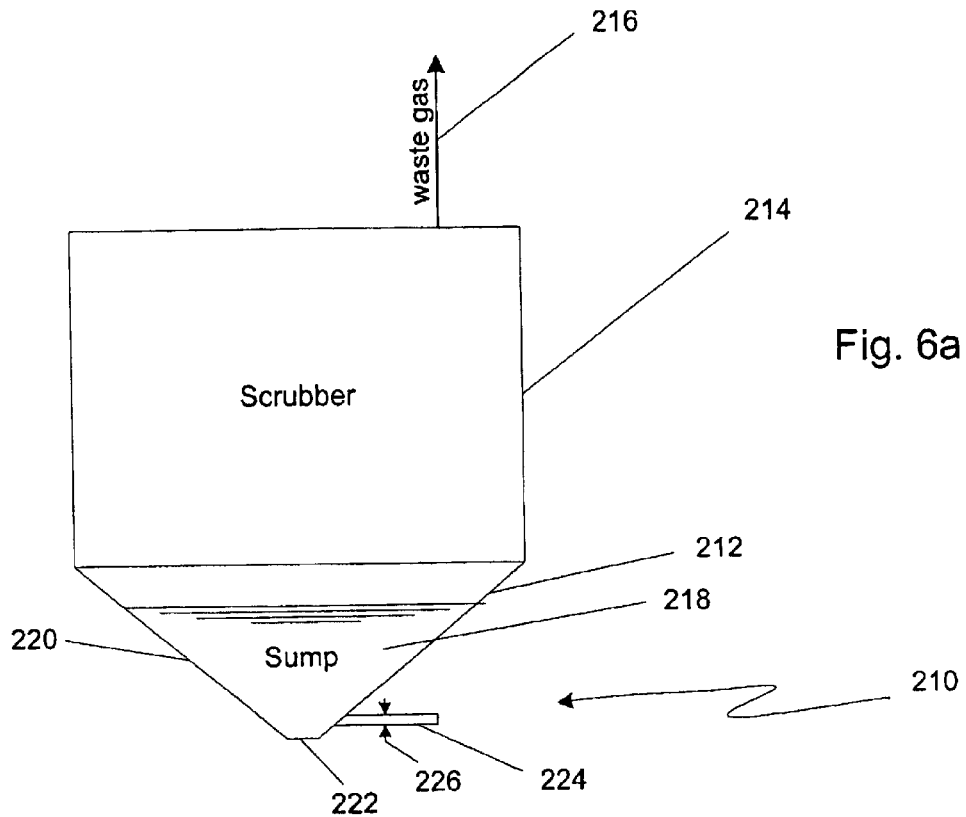
FIG. 6a shows a differential pressure bubbler system according to an embodiment of the invention connected to a sump of a scrubber of the ammonium phosphate production system of FIG. 2.
Figure 6B:
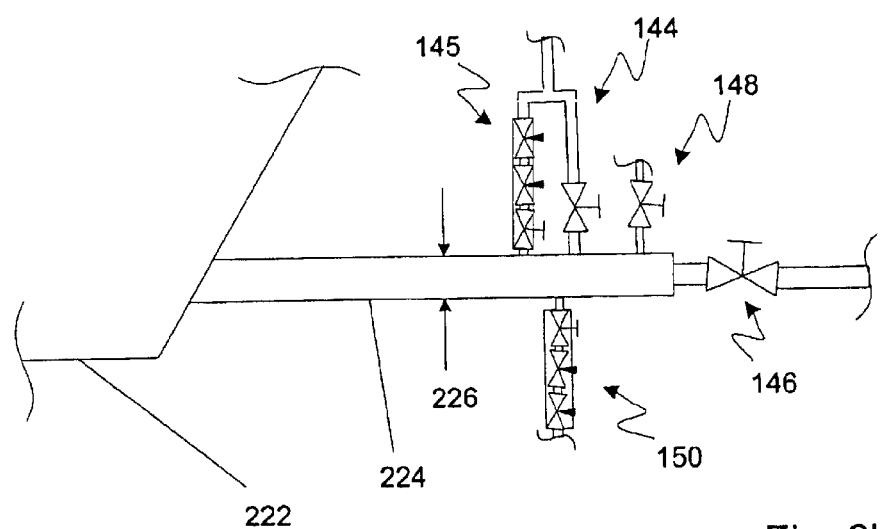

Referring now to FIGS. 6a and 6b, a differential pressure bubbler system 210 is shown according to another embodiment of the invention. Differential pressure bubbler system 210 includes the aspects and preferences of differential pressure bubbler system 112, except as related to the associated tank and fluid, and the orientation and size of the bubble tube. Differential pressure bubbler system 210 in this example is attached to a sump 212 of a scrubber 214. As discussed above in relation to ammonium phosphate production system 110 shown in FIG. 2, scrubber 214 removes harmful substances from exhaust gases 216 produced as part of a reaction for producing phosphoric acid.

In general, scrubber 214 operates by passing exhaust gases (not shown) through an annular throat (not shown) flooded with scrubbing fluid 218. Many of the harmful substances, such as particulate, are captured by scrubbing fluid 218, which collects in sump 212. Differential pressure bubbler system 210 monitors the vertical level of scrubbing fluid 218 to prevent overflow of the scrubbing fluid. As shown, sump 212 has downwardly sloping sidewalls 220, which causes scrubbing fluid 218 to collect at the bottom drain 222. Scrubbing fluid 218 may include a weak phosphoric acid solution, such as a 30% phosphoric acid solution. Due to the acidic nature of the solution, sump 212 may be made from stainless steel, such as 316 stainless steel.

Differential pressure bubbler system 210 generally includes the same components as differential pressure bubbler system 112; however, the orientation and size of the bubble tube 224 is different from bubble tube 140. Because scrubber fluid 218 is not as sticky as slurry 130, bubble tube 224 does not tend to become clogged or to experience the same rate of build-up from scale, sludge, etc. Thus, bubble tube 224 can have a smaller diameter 226 without needing as much maintenance. However, reducing the volume of air contained in bubble tube 224 is desirable to improve the accuracy of measurements. Thus, bubble tube 224 is oriented substantially horizontally to permit a much shorter tube length than a conventional vertical bubble tube system.

As with differential pressure bubbler system 112, bubbler system 212 includes a differential pressure controller (not shown), an air purge line 144, an air supply line 145, a steam purge line 146, a pressure sensor line 148, and a steam bubble line 150. As with bubbler system 112, the combination of air and steam via purge lines 144 and 146 provides advantages for purging, as well as for producing bubbles during operation of bubbler 112 via air supply line 145 and steam bubble line 150. During bubbler operation with air and steam, condensed steam along the inside of bubble tube 224 and at its opening (not shown) reduces the amount of scaling and build-up from contact with scrubber fluid 218. Further, purging with steam helps to soften scale, sludge, and other build-up materials on bubble tube 224, which can help to remove these substances.

Figure 7:
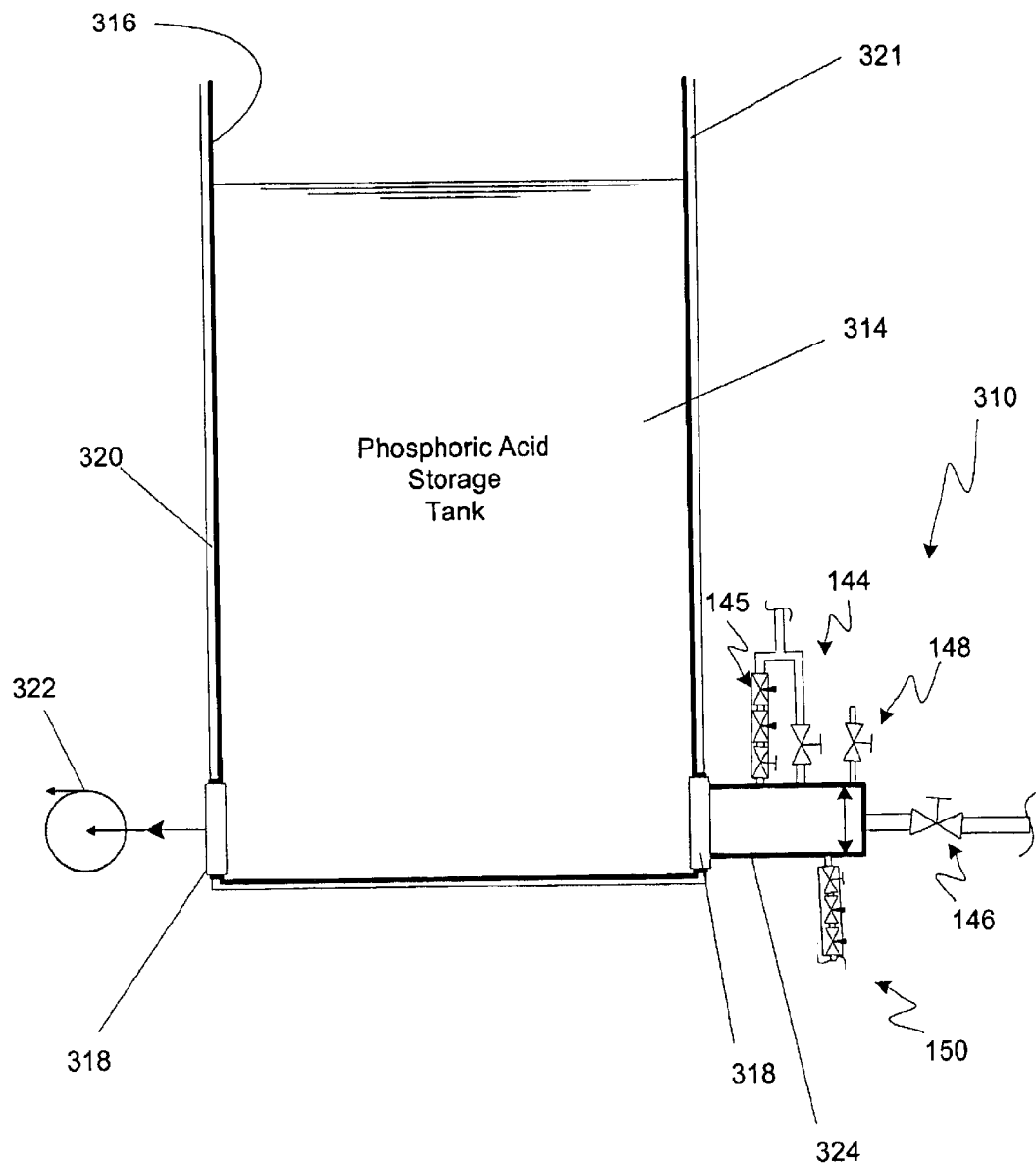
FIG. 7 shows a differential pressure bubbler system according to an embodiment of the invention connected to a phosphoric acid storage tank of the ammonium phosphate production system of FIG. 2.

Referring now to FIG. 7 a differential pressure bubbler system 310 is shown according to another embodiment of the invention. Differential pressure bubbler system 310 includes the aspects and preferences of differential pressure bubbler system 112, except as related to the associated tank and fluid, and orientation and size of the bubble tube. Differential pressure bubbler system 310 in this example is attached to a phosphoric acid storage tank 321. As discussed above in relation to ammonium phosphate production system 110 shown in FIG. 2, phosphate reactor produces phosphoric acid from reactions between phosphate rock and sulfuric acid. Concentrated phosphoric acid 314 having a concentration of about 30% to about 50% is stored in phosphoric acid storage tank 121. Differential pressure bubbler system 310 monitors the vertical level of phosphoric acid solution 314 contained in storage tank 321. Monitoring the vertical level of solution in storage tank 321 prevents overflow of the phosphoric acid solution.

Due to the acidity of phosphoric acid 314 stored in storage tank 321, storage tank 321 is lined with protective rubber 316; the underlying material for storage tank 321 may include a mild steel or like material. Storage tank 321 includes outlet ports 318 through the lower portion of its sidewalls 320, to which one or more pumps 322 are connected to remove phosphoric acid solution 314 during production. These ports may be opened as needed without exposing the underlying material of reactor 312, which lies beneath protective rubber lining 316. To avoid affecting the protective rubber lining 316, differential pressure bubbler system 310 is connected to one of outlet ports 318.

Differential pressure bubbler system 310 generally includes the same components as differential pressure bubbler system 112; however, the orientation and size of the bubble tube 324 is different from bubble tube 140. Because phosphoric acid solution 314 is not as sticky as slurry 130, bubble tube 324 does not tend to become clogged or to experience the same rate of build-up from scale, sludge, etc. Thus, bubble tube 324 can be mounted horizontally using an existing outlet port 318 without needing as much maintenance. However, a larger diameter bubble tube 324, such as a four-inch diameter tube, is still desirable for reducing maintenance requirements and to improve the accuracy of measurements. Further, as with bubble tube 140, it is desirable to maintain a small volume of air within bubble tube 140. Thus, bubble tube 324 is oriented substantially horizontally to permit a much shorter length than a conventional vertical bubble tube system, and has a diameter of about 2 inches to about 6 inches, and preferably has a diameter of about 4 inches.

Due to the acidic nature of phosphoric acid solution 314, bubble tube 324 may also be lined with a protective layer of rubber (not shown). Alternatively, bubble tube 324 may be made from a high grade stainless steel, such as 316L, Hastalloy C, Hastalloy G, Alloy 20, 904L and Zirconium. As with differential pressure bubbler systems 112 and 210, bubbler system 312 includes a differential pressure controller (not shown), an air purge line 144, an air supply line 145, a steam purge line 146, a pressure sensor line 148, and a steam bubble line 150. As with bubbler systems 112 and 210, the combination of air and steam via purge lines 144 and 146 provides advantages for purging, as well as for producing bubbles during operation of bubbler 310 via pressure sensor line 148 and steam bubble line 150. During bubbler operation with air and steam, condensed steam along the inside of bubble tube 324 and at its opening (not shown) reduces the amount of scaling and build-up from contact with phosphoric acid solution 314. Further, purging with steam helps to soften scale, sludge, and other build-up materials on bubble tube 324, which can help to remove these substances.

While the present invention has been described in connection with the illustrated embodiments, it will be appreciated and understood that modifications may be made without departing from the true spirit and scope of the invention. In particular, the invention applies to a wide variety of production processes, facilities and methods. Additionally, a wide variety of systems and methods may be used to measure pressure in a bubble tube and to provide water and/or steam to the bubble tube. Further, the bubbler tube systems of the present invention may be used with a wide variety of fluids. In addition, methods and systems of the present invention do not need to include all aspects and features disclosed in the embodiments discussed herein.

I claim:

1. A method for determining a vertical level of a fluid within a container, the method comprising:

moving air downward along the inside of a bubble tube at an angle from vertical of about 5 degrees to about 85 degrees to an opening of the bubble tube leading into the container; and while moving the air downward, monitoring the pressure of the air in the bubble tube.

2. The method of claim 1, wherein the bubble tube is coupled to the container at an angle from vertical of about 5 degrees to about 85 degrees, and the step of moving air downward includes providing a substantially continuous supply of air to the bubble tube.

3. The method of claim 2, wherein the step of moving air downward further comprises providing a substantially continuous supply of steam to the bubble tube.

4. The method of claim 3, wherein the step of monitoring includes measuring the pressure of a mixture of the air and steam within the bubble tube.

5. The method of claim 1, wherein the step of monitoring includes measuring the pressure of air within an air supply line supplying the air to the bubble tube.

6. The method of claim 1, wherein the fluid is selected from the group consisting of an ammonium phosphate slurry, a scrubber solution, and a phosphoric acid solution.

7. The method of claim 1, wherein for the step of moving, the angle from vertical is about 30 degrees to about 60 degrees.

8. The method of claim 7, wherein for the step of moving, the angle from vertical is about 45 degrees.

9. The method of claim 1, wherein for the step of moving, the bubble tube includes a pipe having a diameter of about 2 inches to about 6 inches.

10. The method of claim 9, wherein for the step of moving, the bubble tube includes a pipe having a diameter of about 4 inches.

11. The method of claim 1, further comprising purging the bubble tube with high-pressure air and high-pressure steam.

12. A method for determining a vertical level of a fluid within a container having a bubble tube coupled to the container for dispensing bubbles into the fluid at a point below the surface of the fluid, the method comprising:

providing a substantially continuous supply of air and steam to the bubble tube; and while providing the air and steam, monitoring the pressure of the air in the bubble tube.

13. The method of claim 12, wherein the step of providing includes injecting air into the bubble tube from an air supply line attached to the bubble tube and injecting steam into the bubble tube from a steam supply line attached to the bubble tube.

14. The method of claim 12, wherein the step of monitoring includes measuring the pressure of a mixture of the air and steam within the bubble tube.

15. The method of claim 12, wherein the step of monitoring includes measuring the pressure of air within an air supply line supplying the air to the bubble tube.

16. The method of claim 12, wherein the fluid is selected from a group consisting of an ammonium phosphate slurry, a scrubber solution, and a phosphoric acid solution.

17. A differential pressure bubbler system comprising:

a tank;

a tube coupled to the tank at an angle from vertical of about 5 degrees to about 90 degrees, the tube having an opening into the tank substantially near a bottom of the tank;

an air supply line coupled to the bubble tube; and a pressure sensor coupled to the bubble tube.

18. The differential pressure bubbler system of claim 17, further comprising a fluid contained within the tank having a vertical level above the tube opening.

19. The differential pressure bubbler system of claim 18, wherein the fluid is selected from the group consisting of an ammonium phosphate slurry, a scrubber solution, and a phosphoric acid solution.

20. The differential pressure bubbler system of claim 17, further comprising a steam inlet line coupled to the tube.

21. The differential pressure bubbler system of claim 20, wherein the steam inlet line is attached to the tube, and the air supply line is attached to the tube.

22. The differential pressure bubbler system of claim 20, wherein the angle from vertical is about 90 degrees.

23. The differential pressure bubbler system of claim 20, wherein the tube has a diameter of about 1 inch.

24. The differential pressure bubbler system of claim 17, further comprising an air purge line and a steam purge line coupled to the tube.

25. The differential pressure bubbler system of claim 17, wherein the angle from vertical is about 30 to about 60 degrees.

26. The differential pressure bubbler system of claim 25, wherein the angle from vertical is about 45 degrees.

27. The differential pressure bubbler system of claim 17, wherein the tube has a diameter of about 2 to about 6 inches.

28. The differential pressure bubbler system of claim 27, wherein the tube has a diameter of about 4 inches.

29. The differential pressure bubbler system of claim 28, wherein the angle from vertical is about 45 degrees and the length of the tube is about 10 inches to about 24 inches.

30. A differential pressure bubbler system comprising:

an ammonium phosphate reactor tank containing an ammonium phosphate slurry, the reactor tank having a substantially vertical side wall;

a bubble tube attached to the side wall substantially near a bottom of the tank at an angle of about 5 to about 85 degrees from the side wall;

an air supply line coupled to the bubble tube; and a steam supply line coupled to the bubble tube.

31. The differential pressure bubbler system of claim 30, wherein the angle from the side wall is about 45 degrees, the diameter of the bubble tube is about 4 inches, and the length of the bubble tube is about 4 inches.

* * * * *

UNITED STATES PATENT AND TRADEMARK OFFICE
CERTIFICATE OF CORRECTION

PATENT NO. : 6,826,956 B1
DATED : December 7, 2005
INVENTOR(S) : Russell Van Mathews It is certified that error appears in the above-identified patent and that said Letters Patent is hereby corrected as shown below:

Column 2,
Line 15, "The differential pressure bubbler system of claim 30, wherein the angle from the side wall is about 45 degrees, the diameter of the bubble tube is about 4 inches, and the length of the bubble tube is about 4 inches" should be replaced with -- The differential pressure bubbler system of claim 30, wherein the angle from the side wall is about 45 degrees, the diameter of the bubble tube is about 4 inches, and the length of the bubble tube is about 10 to 24 inches --.

Signed and Sealed this

Thirteenth Day of September, 2005

JON W. DUDAS
*Director of the United States Patent and Trademark Office*